Dec. 29, 1964   H. J. CONRAD   3,163,090
HYDROSTATIC CONVERTER
Filed Dec. 20, 1962   2 Sheets-Sheet 1

Inventor:
Hans Joachim Conrad
By

Dec. 29, 1964  H. J. CONRAD  3,163,090
HYDROSTATIC CONVERTER
Filed Dec. 20, 1962  2 Sheets-Sheet 2
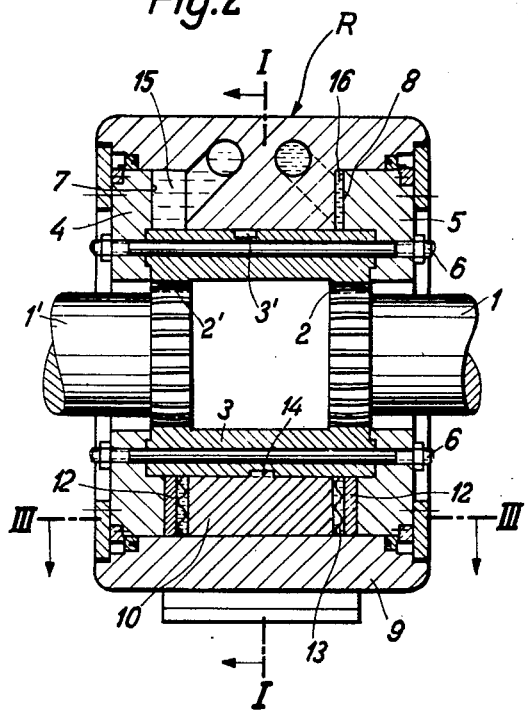
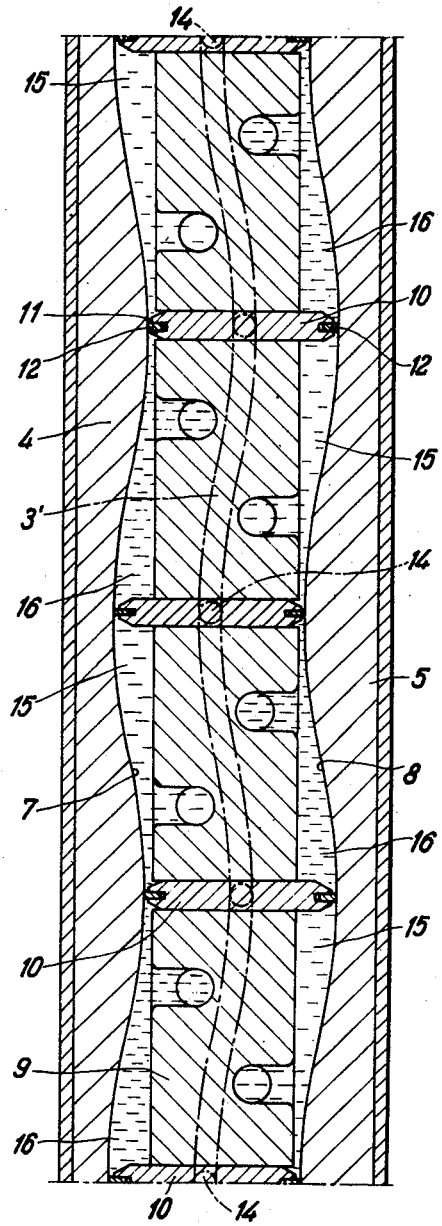
Inventor:
Hans Joachim Conrad
By
Walter Becker United States Patent Office 3,163,090
Patented Dec. 29, 1964

3,163,090
HYDROSTATIC CONVERTER
Hans Joachim Conrad, Essen, Germany, assignor to Beteiligungs- und Patentverwaltungsgesellschaft mit beschrankter Haftung, Essen, Germany
Filed Dec. 20, 1962, Ser. No. 246,661
Claims priority, application Germany Dec. 23, 1961
7 Claims. (Cl. 91—126)

The present invention relates to a converter by means of which a reciprocatory movement is converted into a rotary movement. With devices of this type, a reciprocatory piston equipped displacing device is, through a pressure fluid filled transmitting system, operatively connected to a rotary piston equipped displacing device the position of which corresponds to the respective position of the reciprocatory piston equipped displacing device.

It has been suggested in connection with converters for converting a reciprocatory movement into a rotary movement, to employ a housing with a rotary piston therein as a rotary piston equipped displacing device. Movement converters of this type are intended to replace the well known mechanical crank drive which latter has with regard to the movement converters above all the disadvantage that the reciprocating and rotating machine elements of the crank drive have to have a certain relationship with regard to each other. With the above mentioned converters the said certain or fixed relationship between the reciprocating and rotating machine elements is not an indispensable requirement. Moreover, with the above mentioned hydrostatic movement converters, it is possible to avoid bearing pressures by providing the pressure chambers of the rotary piston equipped displacing device in a symmetrical manner in cooperation with a reciprocating piston equipped displacing device in such a way that the rotary pressure forces exerted by the pressure medium upon the rotary piston will balance each other. This advantage makes such movement converters particularly well suited for large piston internal combustion engines in which, when employing a mechanical crank drive, the forces exerted upon the bearings of the crank shaft become very considerable.

It is an object of this invention to improve the above mentioned heretofore known movement converters.

The frictional surfaces of the rotary pistons of such movement converters have milled therein curved pockets in which, during rotation of the rotary piston, sliding members slide which carry out an axial movement determined by the curved shape of the pockets, and which separate from each other the pressure chambers between the stationary housing and the rotary piston while the latter rotates.

It is another object of this invention so to design the sliding members which slide back and forth in axial direction in the pockets of the rotary piston during rotation thereof and carry out the above mentioned movement in conformity with the contour of the curvature of the pockets, that the sealing surfaces will not be subjected to the forces required for guiding the sliding members.

These and other objects and advantages of the invention will appear more clearly from the following specification in connection with the accompanying drawings, in which:

FIG. 1 diagrammatically illustrates a cross section through a hydrostatic movement converter according to the present invention.

FIG. 2 is a section taken along the line II—II of FIG. 1 with the reciprocating piston equipped portion of the converter arrangement omitted.

FIG. 3 illustrates on an enlarged scale a development viewed along the line III—III of FIG. 2.

FIG. 6 is a partial longitudinal section through a portion of a sliding member somewhat modified over that of FIGS. 4 and 5.

FIG. 7 is a section taken along the line VII—VII of FIG. 6.

Figure 1:
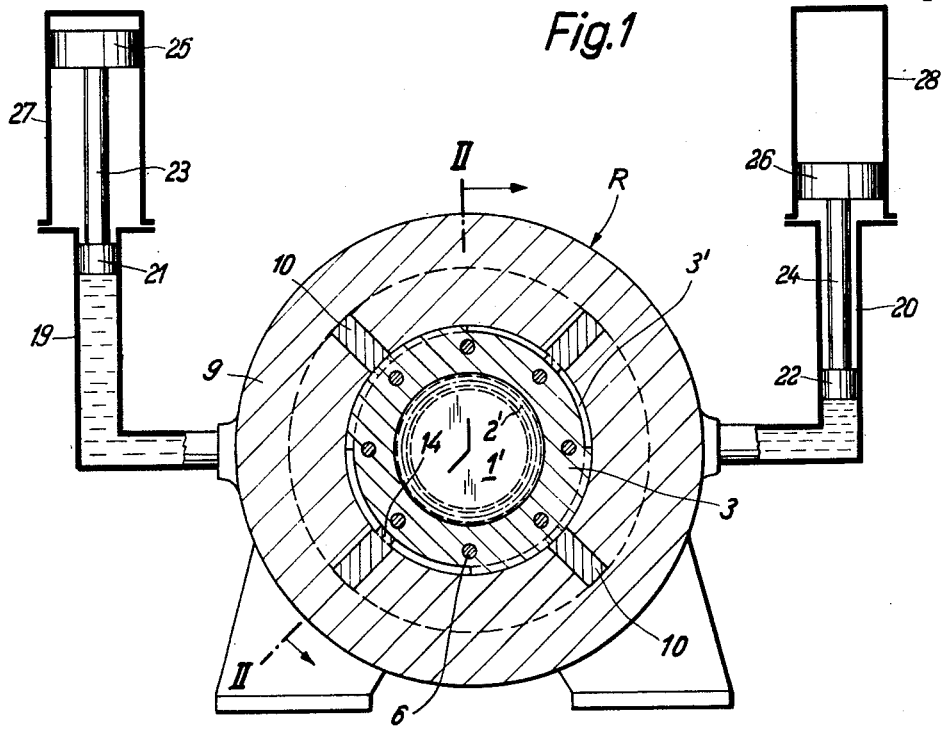

The sliding members which, in customary manner, have their end faces provided with sealing elements, are according to the invention provided with guiding means for positively imparting a reciprocatory sliding movement upon the sliding members in conformity with the curvature of the side walls of the chamber means formed in the rotor so that in response to a rotary movement of the rotor relative to the housing the axial sliding movement of the sliding members will be effected positively and independently of the sealing elements.

According to one specific embodiment of the present invention, the reciprocatory sliding movement of the sliding members is positively effected by providing the sliding members with means engaging and being guided by a curved track in the rotor.

According to another embodiment of the invention, the sliding members are provided with guiding pins for engagement with the side walls of the curved passage in the rotor while the sealing elements are in a spring biased manner supported by the pins.

In this way, with both embodiments just mentioned, the sealing elements are employed solely for effecting a seal without being subjected to the forces which are required for displacing the respective sliding member or for pressing the same against the surfaces to be sealed.

According to a further feature of the invention, the sealing elements of the sliding members may consist of a material suitable for sealing purposes, expediently of soft cast iron as it is employed for instance for making piston rings for pistons of rotary piston internal combustion engines. The sliding members on the other hand may consist of a material which is particularly well suitable for sliding purposes, as for instance bronze.

According to still another feature of the invention, the side surfaces of the sliding members may be provided with grooves which through bores communicate in such a manner with those portions of the sliding member which are subjected to a pressure medium that during rotation of the rotary piston periodically the individual grooves will communicate with the pressure chambers between rotary piston and housing in such a way that the pressure forces exerted upon the respective sliding member will balance each other.

Referring now to the drawings in detail, the rotary piston part generally designated R comprises a shaft including two shaft sections 1 and 1' having mounted thereon a bushing 3. To permit the transmission of power from the bushing to the shaft sections 1, 1' even if the latter are not in axial alignment, there is provided an arched gear coupling 2, 2' meshing with corresponding teeth in the bushing 3. Bushing 3 is connected to annular wall members 4 and 5 by means of tie rods 6. Bushing 3 together with the annular wall members 4 and 5 forms the rotor of the rotary piston part of the movement converter. The surfaces 7 and 8 of the annular wall members 4 and 5 are equidistant and according to the development shown in FIG. 3 follow the contour of a sine line. It will be appreciated that the outer periphery of the bushing 3 with the annular members or side walls 4, 5 forms an annular passage in the rotor the side walls of which in this particular instance are sine shaped.

Provided in the housing 9 are four sliding members 10 which are axially displaceable in corresponding recesses. The end faces 11 of said sliding members 10 are provided with sealing elements or strips 12 which by means of springs 13 are pressed against the equidistant surfaces 7, 8. The outer circumference of bushing 3 has cut therein a groove 3' which is engaged by studs 14 of the sliding members 10. Groove 3' in bushing 3 corresponds as to shape to the contour of the equidistant surfaces 7, 8 of the annular members 4, 5 so that the sliding members 10 during rotation of the rotary piston 3, 4, 5 will slide in axial direction back and forth between the surfaces thereby carrying out a sine movement.

Furthermore, the sealing strips 12 may during the operation additionally be pressed against the equidistant surfaces 7, 8 by the fluid pressure in the manner described for instance in my U.S. Patent No. 3,066,476 column 6 lines 7 et seq. As will be obvious from the above, the sealing strips will be relieved from guiding forces and will merely serve for sealing purposes.

As will be evident from FIG. 3, between each two sliding members 10 there are formed two pressure chambers 15, 16 while for instance the pressure chamber 15 communicates with the cylinder 19 (see FIG. 1), and the pressure chamber 16 communicates with cylinder 20. In these cylinders 19, 20, pistons 21, 22 respectively reciprocate which through the piston rods 23, 24 are respectively connected to pistons 25, 26 reciprocable in cylinders 27, 28 respectively and forming part of an internal combustion cylinder piston engine.

Depending on the desired speed and accelerating ratio of the reciprocable pistons, the equidistant surfaces 7, 8 may in circumferential direction also have a curve different from a sine-shaped contour.

Figure 4:
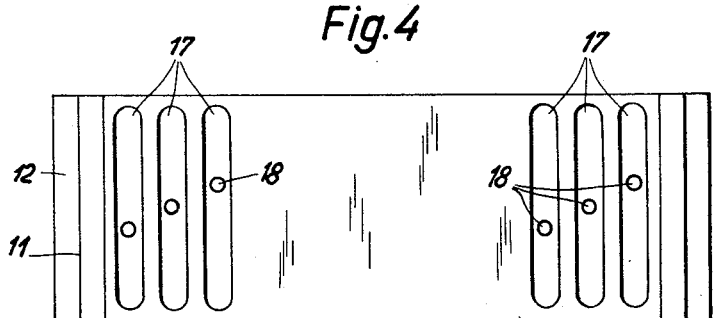
FIG. 4 shows on an enlarged scale a side view of a sliding member for use in connection with the converter arrangement according to the invention.
Figure 5:
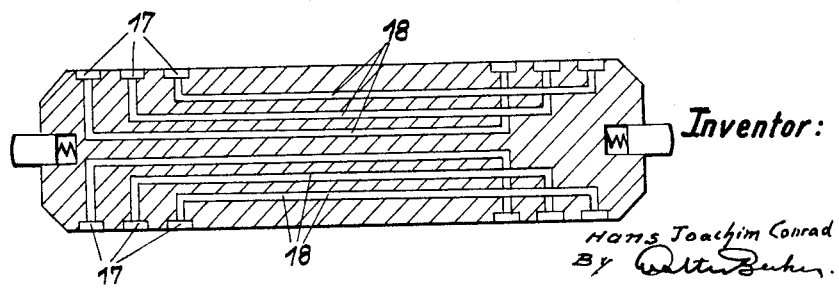
FIG. 5 is a top view of FIG. 4.

With the sliding members illustrated in FIGS. 4 and 5, the side surfaces have grooves 17 therein which communicate with bores 18 in such a way that during the axial movement of the sliding member, the grooves 17 are periodically placed into communication with the pressure chambers 15 and 16 respectively in such a way that the pressure forces exerted by the pressure medium upon the sliding member will balance each other so that the sliding member itself will be relieved from pressure forces exerted by the pressure medium. By employing this pressure balancing arrangement, it will be assured that the sliding member during its reciprocatory movement, so to speak, floats on a cushion of pressure medium so that the friction forces which would otherwise occur during the sliding of metallic surfaces and could assume a relatively high magnitude will be reduced to a minimum.

According to a modification of the sliding members as illustrated in FIGS. 6 and 7, the sliding members may laterally be provided with studs or pins 14' which extend through bores 12a in the sealing strips 12 so as to slide on the surfaces 7, 8 of the annular members 4, 5 respectively. Advantageously, the sliding members 10, 12 may consist of a material with good sliding properties, as for instance bronze. With the design of FIGS. 6 and 7 of the sliding members, the guiding groove 3' may be omitted.

It is, of course, to be understood that the present invention is, by no means, limited to the particular constructions shown in the drawings but also comprises any modifications within the scope of the appended claims.

What I claim is:

1. In a hydrostatic converter for converting a reciprocatory movement into a rotary movement: a housing having a first and a second opening for respective connection with fluid conveying conduit means, a rotary body rotatable in said housing and provided with a circumferentially extending passage having curved and substantially equidistant side walls, a portion of said housing extending into said passage and together with other housing parts and said side walls and other parts of said rotary body confining chamber means located on opposite sides of said housing portion, partition means slidably mounted in said housing portion and spaced from each other in circumferential direction of said rotary body while being slidable in axial direction of said rotary body to thereby divide said chamber means into a plurality of chambers, a first group of passage means arranged in said housing and connected on one hand with said first opening and on the other hand with every other chamber on said opposite sides of said housing portion, a second group of passage means arranged in said housing and connected on one hand to said second opening and on the other hand to chambers respectively arranged between every other chamber, sealing means respectively carried by the end portions of said partition means and movable independently thereof and relative to the respective partition means carrying the same, yieldable means acting on said sealing means for continuously holding said sealing means in sealing engagement with the respective adjacent portion of the side walls of said rotary body, and means operatively interconnecting said rotary body and said partition means and operable to impart upon said partition means a reciprocatory sliding movement relative to said sealing means in conformity with the curvature on said side walls in response to a rotary movement of said rotary body relative to said housing.

2. In a hydrostatic converter for converting a reciprocatory movement into a rotary movement: a housing having a first and a second opening for respective connection with fluid conveying conduit means, a rotary body rotatable in said housing and provided with a circumferentially extending passage having curved and substantially equidistant side walls, a portion of said housing extending into said passage and together with other housing parts and said side walls and other parts of said rotary body confining chamber means located on opposite sides of said housing portion, partition means slidably mounted in said housing portion and spaced from each other in circumferential direction of said rotary body while being slidable in axial direction of said rotary body to thereby divide said chamber means into a plurality of chambers, a first group of passage means arranged in said housing and connected on one hand with said first opening and on the other hand with every other chamber on said opposite sides of said housing portion, a second group of passage means arranged in said housing and connected on one hand to said second opening and on the other hand to chambers respectively arranged between every other chamber, the end faces of said partition means being provided with recess means, sealing means arranged within said recess means and movable in longitudinal direction of and relative to said partition means, yieldable means provided within said recess means for continuously holding said sealing means in sealing engagement with the respective adjacent portions of the side walls of said rotary body, and means operatively interconnecting said rotary body and said partition means and operable to impart upon said partition means a reciprocatory sliding movement relative to said sealing means in conformity with the curvature of said side walls in response to a rotary movement of said rotary body relative to said housing.

3. A hydrostatic converter according to claim 1, in which the bottom portion of said passage and those surfaces of said partition means which face said bottom portion are provided with positively guidingly interengaging means for positively imparting a reciprocatory sliding movement upon said partition means in conformity with the curvature of said side walls in response to a rotary movement of said rotary body relative to said housing.

4. A hydrostatic converter according to claim 1, in which the bottom of said passage of said rotary body is provided with an annular groove substantially parallel to the curved contour of said side walls, and in which said partition means are provided with extension means slidably engaging said annular groove and being guided thereby whereby said partition means is reciprocated in axial direction of said rotary body in response to a rotary movement of the latter relative to said housing.

5. A hydrostatic converter according to claim 1, in which the end faces of each partition means have protruding means extending in the direction toward and being in sliding engagement with the respective adjacent side wall portion, and in which said sealing means slidably surround said protruding means and are movable relative thereto.

6. In a hydrostatic converter for converting a reciprocatory movement into a rotary movement: a housing having a first and a second opening for respective connection with fluid conveying conduit means, a rotary body rotatable in said housing and provided with a circumferentially extending passage having curved and substantially equidistant side walls, a portion of said housing extending into said passage and together with other housing parts and said side walls and other parts of said rotary body confining chamber means located on opposite sides of said housing portion, partition means slidably mounted in said housing portion and spaced from each other in circumferential direction of said rotary body while being slidable in axial direction of said rotary body to thereby divide said chamber means into a plurality of chambers, a first group of passage means arranged in said housing and connected on one hand with said first opening and on the other hand with every other chamber on said opposite sides of said housing portion, a second group of passage means arranged in said housing and connected on one hand to said second opening and on the other hand to chambers respectively arranged between every other chamber, sealing means respectively carried by the end portions of said sealing means and movable independently thereof and relative to the respective partition means carrying the same, means continuously acting upon said sealing means and holding the same in sealing engagement with the respective adjacent side wall portion, and means operatively interconnecting said rotary body and said partition means and operable to impart upon said partition means a reciprocatory sliding movement relative to said sealing means in conformity with the curvature of said side walls in response to a rotary movement of said rotary body relative to said housing, each of said partition means being provided with conduit means therethrough leading from one outside area of said partition means where the respective pressure condition tends to impart upon the respective partition means a torque in one direction to another outside area of the same partition means where when the pressure condition of said one area is conveyed thereto a torque will be exerted upon said respective partition means which is directed counter to said first mentioned torque whereby said first mentioned torque is counteracted to at least a great extent.

7. A hydrostatic converter according to claim 6, in which the conduit means in each of said partition means lead from a surface portion thereof near a chamber subjected to one pressure condition to a surface portion of the same partition means near a chamber which at the same time is subjected to another pressure condition.

References Cited in the file of this patent
UNITED STATES PATENTS

| | | |
|---|---|---|
| 299,260 | Price | May 27, 1884 |
| 761,512 | Lecomte | May 31, 1904 |
| 2,658,486 | De Waide | Nov. 10, 1953 |
| 3,066,476 | Conrad | Dec. 4, 1962 |